United States Patent
Ilic et al.

(10) Patent No.: US 11,861,388 B2
(45) Date of Patent: Jan. 2, 2024

(54) USER PROFILE MANAGEMENT FOR NON-DOMAIN JOINED INSTANCE VIRTUAL MACHINES

(71) Applicant: Frame Platform, Inc., San Jose, CA (US)

(72) Inventors: Darko Ilic, San Mateo, CA (US); Marko Stanojevic, Nis (RS)

(73) Assignee: FRAME PLATFORM, INC., San Jose, CA (US)

( * ) Notice: Subject to any disclaimer, the term of this patent is extended or adjusted under 35 U.S.C. 154(b) by 468 days.

(21) Appl. No.: 16/944,003

(22) Filed: Jul. 30, 2020

(65) Prior Publication Data

US 2022/0004416 A1  Jan. 6, 2022

Related U.S. Application Data

(60) Provisional application No. 63/048,632, filed on Jul. 6, 2020.

(51) Int. Cl.
*G06F 9/455* (2018.01)
*H04L 9/40* (2022.01)

(52) U.S. Cl.
CPC ........ *G06F 9/45558* (2013.01); *H04L 63/083* (2013.01); *G06F 2009/4557* (2013.01); *G06F 2009/45595* (2013.01)

(58) Field of Classification Search
CPC ........ G06F 9/45558; G06F 2009/4557; G06F 2009/45595; G06F 21/53; H04L 63/083
See application file for complete search history.

(56) References Cited

U.S. PATENT DOCUMENTS

| | | | |
|---|---|---|---|
| 8,505,083 B2 | 8/2013 | Kuzin et al. | |
| 8,549,518 B1 | 10/2013 | Aron et al. | |
| 8,650,625 B2 | 2/2014 | Grandcolas et al. | |
| 8,812,687 B2* | 8/2014 | Das | H04L 67/10 718/1 |
| 8,850,130 B1 | 9/2014 | Aron et al. | |
| 8,856,917 B2 | 10/2014 | Das et al. | |
| 9,392,078 B2* | 7/2016 | Seliger | H04L 67/146 |
| 9,654,473 B2 | 5/2017 | Miller | |
| 9,860,064 B2 | 1/2018 | Huang et al. | |
| 10,331,475 B2 | 6/2019 | Beveridge et al. | |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Jacob D Dascomb
(74) *Attorney, Agent, or Firm* — Foley & Lardner LLP (57) ABSTRACT

An illustrative embodiment disclosed herein is an apparatus including a processor having programmed instructions to receive a request for a computing device associated with a user to remotely access a session on an operating system of a non-domain joined instance (non-DJI) virtual machine (VM). The processor includes programmed instructions to, automatically and responsive to the request, cause a server to attach, to the VM, a disk for storing a profile of the user, assign an account of the operating system to the user, reset a password for the account, login the user to the session on the VM using the account and the password, mount, on the VM, the profile, and cause a connection to be established between the computing device and the VM.

20 Claims, 3 Drawing Sheets

(56) References Cited

U.S. PATENT DOCUMENTS

| | | | |
|---|---|---|---|
| 2007/0171921 A1* | 7/2007 | Wookey | H04L 63/10 |
| | | | 707/E17.013 |
| 2010/0031348 A1* | 2/2010 | Lam | G06F 21/53 |
| | | | 726/19 |
| 2013/0246596 A1* | 9/2013 | Fujiwara | H04L 41/08 |
| | | | 709/223 |
| 2015/0115551 A1 | 4/2015 | Schenk et al. | |
| 2017/0223010 A1 | 8/2017 | Wilkinson et al. | |
| 2017/0371519 A1 | 12/2017 | Beveridge et al. | |
| 2018/0115551 A1 | 4/2018 | Cole | |
| 2019/0370034 A1 | 12/2019 | Goodman | |
| 2020/0117498 A1* | 4/2020 | Unnikrishnan | G06F 9/45558 |
| 2021/0152345 A1 | 5/2021 | Beloskur et al. | |
| 2021/0216352 A1* | 7/2021 | Kripalani | G06F 9/45533 |

OTHER PUBLICATIONS

How pGina Works—pgina_pgina Wiki—GitHub—Jul. 11, 2014.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

RFC 4880—OpenPGP Message Format Nov. 2007.

The impact of managing user profiles with FSLogix _ GO-EUC—Sep. 17 2019.

Vmware-stateless-virtual-desktops-ref-arch-white-paper-2012.

* cited by examiner

USER PROFILE MANAGEMENT FOR NON-DOMAIN JOINED INSTANCE VIRTUAL MACHINES

CROSS-REFERENCE TO RELATED APPLICATION

This U.S. Non-Provisional patent application is related and claims priority under 35 U.S. § 119(e) to U.S. Provisional Application No. 63/048,632, filed Jul. 6, 2020, titled "USER PROFILE MANAGEMENT FOR NON-DOMAIN JOINED INSTANCE VIRTUAL MACHINES," the entire contents of which are incorporated herein by reference for all purposes.

BACKGROUND

Non-persistent desktop refers to a feature that allows a personal computer's desktop environment to be run remotely on one system (e.g., personal computer, server), while being displayed on a separate client device. Some non-persistent desktop applications allow attaching to an existing user's session (e.g., a running desktop) and remote controlling, either displaying the remote-control session or blanking the screen.

SUMMARY

Aspects of the present disclosure relate generally to a virtualization environment, and more particularly to session management of non-domain joined instance (non-DJI) virtual machines.

An illustrative embodiment disclosed herein is an apparatus including a processor having programmed instructions to receive a request for a computing device associated with a user to remotely access a session on an operating system of a non-domain joined instance (non-DJI) virtual machine (VM). The processor includes programmed instructions to, automatically and responsive to the request, cause a server to attach, to the VM, a disk for storing a profile of the user, assign an account of the operating system to the user, reset a password for the account, login the user to the session on the VM using the account and the password, mount, on the VM, the profile, and cause a connection to be established between the computing device and the VM.

Another illustrative embodiment disclosed herein is a non-transitory computer readable storage medium having instructions stored thereon that, upon execution by a processor, causes the processor to perform operations including receiving a request for a computing device associated with a user to remotely access a session on an operating system of a non-domain joined instance (non-DJI) virtual machine (VM). The operations include, automatically and responsive to the request, causing a server to attach, to the VM, a disk for storing a profile of the user, assigning an account of the operating system to the user, resetting a password for the account, logging in the user to the session on the VM using the account and the password, mounting, on the VM, the profile, and causing a connection to be established between the computing device and the VM.

Another illustrative embodiment disclosed herein is a computer-implemented method including receiving, by a processor, a request for a computing device associated with a user to remotely access a session on an operating system of a non-domain joined instance (non-DJI) virtual machine (VM). The method includes, automatically and responsive to the request, causing, by the processor, a server to attach, to the VM, a disk for storing a profile of the user, assigning, by the processor, an account of the operating system to the user, resetting, by the processor, a password for the account, logging in, by the processor, the user to the session on the VM using the account and the password, mounting, by the processor and on the VM, the profile, and causing, by the processor, a connection to be established between the computing device and the VM.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In a non-persistent (e.g., stateless) desktop account of a virtual desktop infrastructure (VDI), sessions are stateless. That is, changes made to a profile, such as application settings, desktop preferences and/or login credentials, of a virtual machine (VM) instance are deleted from the VM instance after the session is closed. The VM instance can then be returned to a pool where it waits to be served to the next user. Users desire to preserve the profile in a VDI account. Conventional technologies that attempt personalization of non-persistent desktops do not work out-of-box for non-domain joined instance (non-DJI) VMs, which are VMs that lack of group policy for management and domain trust for authentication/authorization.

Disclosed herein are embodiments of a system, method, and computer readable media that allow personalization of a user profile while still delivering virtual desktops from a master image on non-DJI virtual machines. In some embodiments, the system collects user profile data on session end and saves the user profile data to a secure disk tied to a specific non-persistent desktop user. In some embodiments, when the user logs into a stateless session, their profile disk is automatically attached to the virtual machine and made available to their session. Advantageously, the system provides seamless per-user customization for non-DJI instances without losing the management benefits of stateless instances. Moreover, the system decouples the user profile from the operating system (OS), making user profiles universally portable.

In some embodiments, the end user logged into a platform and performs an input/output (I/O) action (e.g., clicks) to start their Desktop or Application. The I/O action can instruct a backplane to look for a disk associated with a profile of the end user and attach it to an incoming session. In some embodiments, once the physical disk is successfully attached, the user is logged in to a session on a VM, and the user profile is mounted in an operating system of the VM. Once the session is closed, the user session can be logged off, any changes can be persisted in the user profile, and profile disk can be detached. In some embodiments, administrators can backup/restore user profile disks.

Virtualization Technology and Environment

Figure 1:
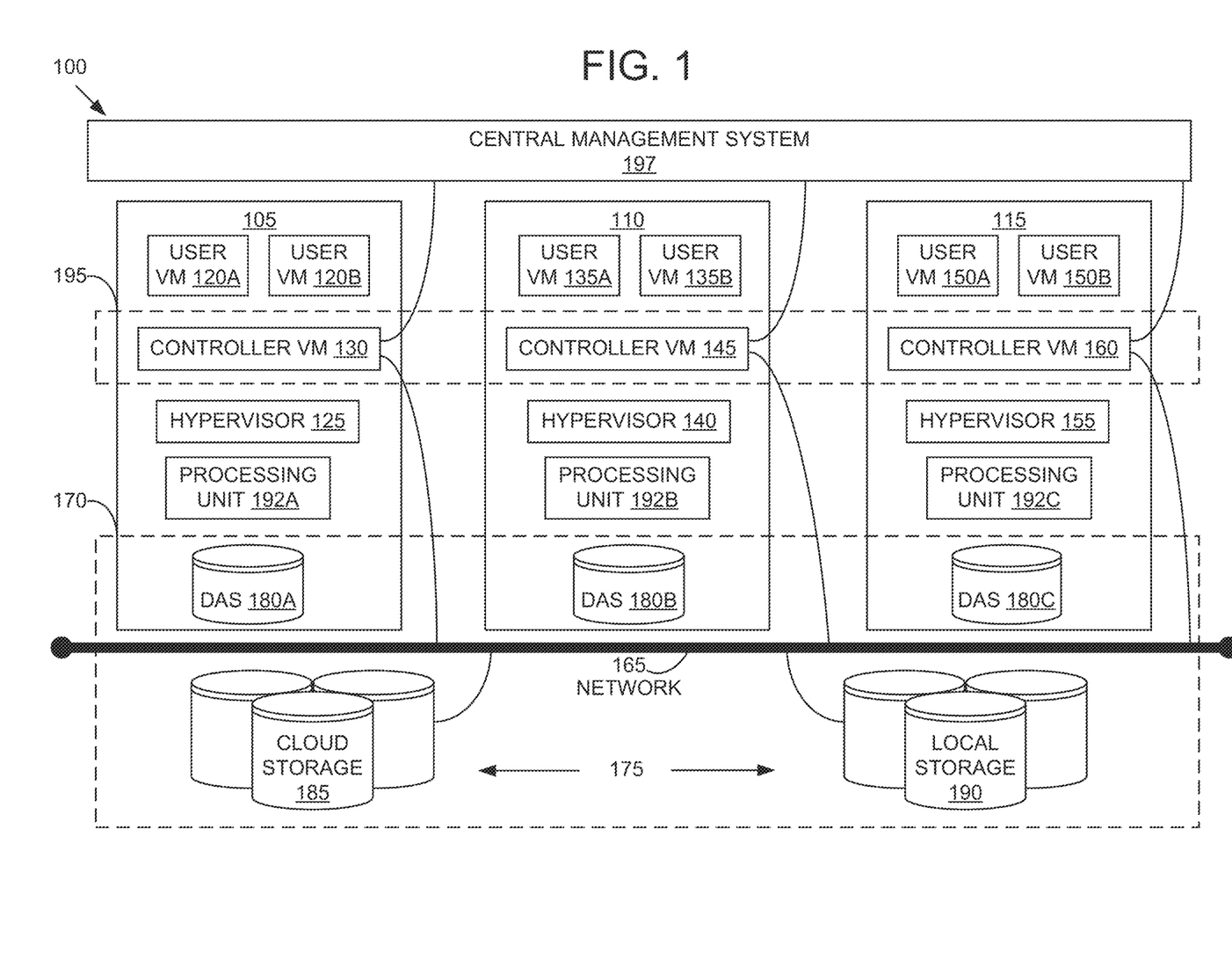
FIG. 1 is an example block diagram of a virtual computing system, in accordance with some embodiments of the present disclosure.

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a cluster (e.g., storage cluster, physical cluster, cluster of nodes, cluster of nodes in a network, etc.). Generally speaking, all of the nodes (e.g., the first node 105, the second node 110, and the third node 115) in the virtual computing system 100 may be divided into one or more clusters. One or more components of the storage pool 170 or the processing units 192 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

User Profile Management for Non-domain Joined Instance Virtual Machines

Figure 2:
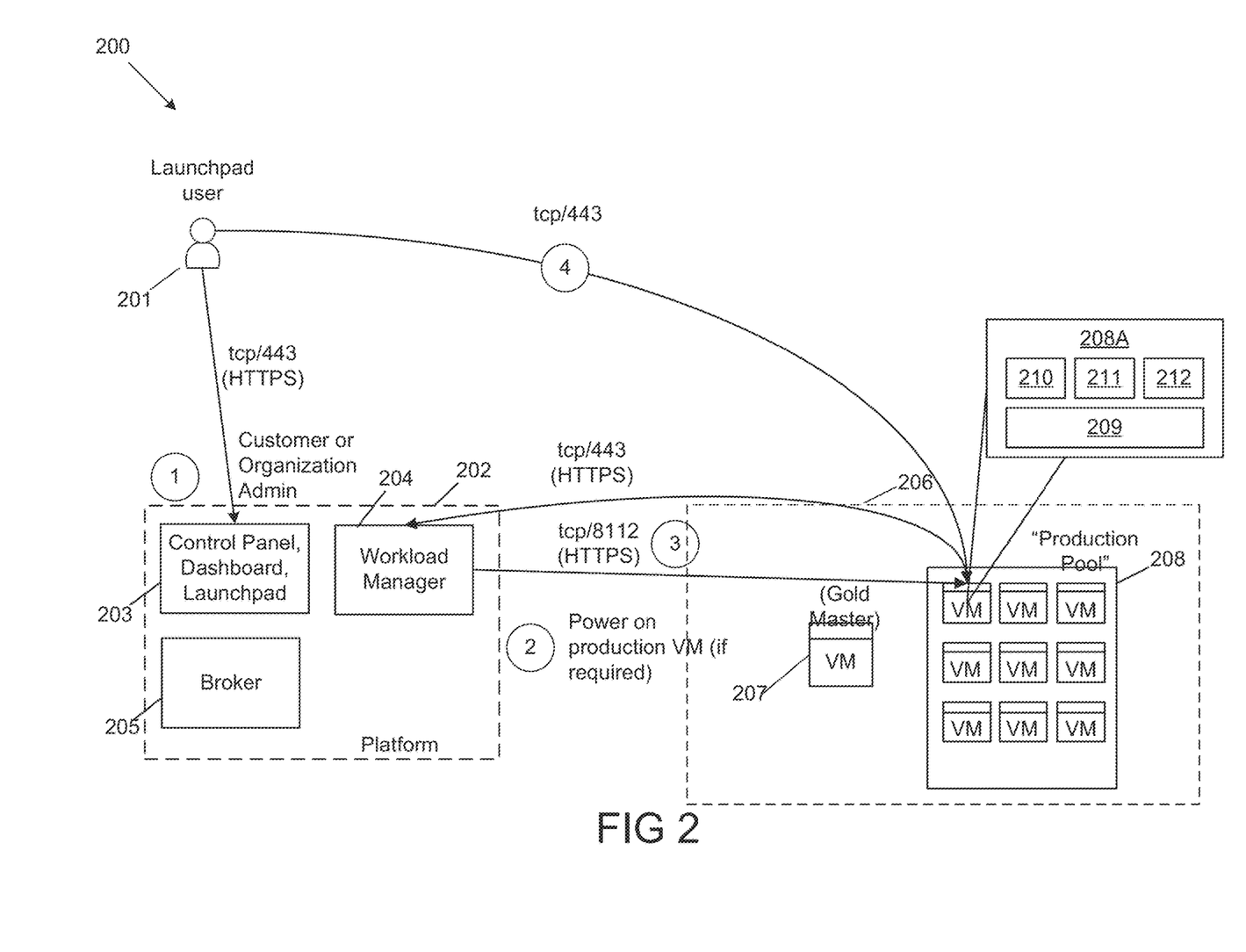
FIG. 2 is an example block diagram of a non-domain joined instance (non-DJI) system, in accordance with some embodiments of the present disclosure.

Referring now to FIG. 2, an example block diagram of a non-domain joined instance (non-DJI) system 200 is shown, in accordance with some embodiments of the present disclosure. The non-DJI system 200 includes a user (e.g., a computing device of the user, a client) 201, a platform 202 in communication with the user 201, and a plurality of virtual machines 206. The platform 202 (e.g., server) includes a control panel (e.g., a launchpad, a dashboard, a front-end of the platform) 203, a workload manager (e.g., a backplane, a back-end of the platform, a profile disk manager, an infrastructure as a service (IaaS) orchestrator, a gateway to the infrastructure provider) 204, and a broker 205. In some embodiments, the control panel 203 has programmed instructions to receive one or more inputs from a user to initiate a session. The workload manager 204 has programmed instructions to communicate with infrastructure providers by, e.g., making calls to the infrastructure provider application programming interface (API). The workload manager 204 has programmed instructions to (e.g., makes an API call to the infrastructure provider API to) attach a disk (e.g., a profile disk, a physical disk) for storing a profile to a reserved VM at a session start and detach a disk at a session end. The profile includes registry and file system artifacts/data (e.g., views, shortcuts, wallpapers, screen savers, color schemes, supplementary files, dictionaries, signatures, auto-complete files, MRU lists, cookies, history, toolbars, auto text, connection settings, etc.) that are associated with the individual user's session and shape an OS/application environment within that. The workload manager 204 has programmed instructions to backup and restore a user's profile disk, as well as adjust a size of the user's profile disk.

The plurality of virtual machines 206 includes a virtual machine (VM) image (e.g., master image, gold image) 207 and a plurality of workload VMs (e.g., production VMs, pool of VMs, etc.) 208. Each workload VM 208 (e.g., a workload VM 208A) includes an operating system (OS) 209 and applications such as a guest agent 210, a credential provider 211, and a disk service 212 (e.g., a profile disk service 212). In some embodiments, the workload manager 204 has programmed instructions to create (e.g., clone, generate) the plurality of workload VMs 208 from the VM image 207. The credential provider 211 has programmed instructions to initiate a login for a user (e.g., a OS 209 user) logged into an account (e.g., a OS account) of the OS 209. The disk service 212 has programmed instructions to, in some embodiments, suspend the OS 209 login sequence to perform (e.g., automatically, transparently) a mapping of an external profile stored on a profile disk using the file system filter driver and registry filter driver. The guest agent 210 has programmed instructions to orchestrate tasks on managed VMs including the calls to credential provider 211 or disk service 212.

The credential provider 211 enables a remote, programmatic interactive session logon with supplied local or domain user credentials. In some embodiments, profile management for non-domain joined instance (non-DJI) VMs uses local (e.g., to the platform) credentials. In some embodiments, credentials are generated (e.g., randomly) on a session start by the guest agent 210 (e.g., not passed remotely). In some embodiments, credentials are discarded (e.g., not persisted) on a session end.

With reference to FIG. 2, a first connection/communication channel (e.g., a web-socket connection) is established between the user 201 and the platform 202 (e.g., the control panel 203). The user 201 logs into the control panel 203. In some embodiments, the user 201 is an individual (e.g., an employee, a user without administrative rights, an administrator) or another service/application. In some embodiments, the control panel 203 is a web application (e.g., accessible in a browser). The control panel 203 has programmed instructions to generate a request based on interaction from the user 201 or receive a request from the user 201 to start an application or desktop session. In some embodiments, the control panel 203 has programmed instructions to generate the request by receiving a single input (e.g., single click) from the user 201. In some embodiments, to generate/receive the request, the user 201 directs a cursor to an icon or other visual element and clicks on it using an input device (e.g., a mouse). In some embodiments, to generate/receive the request, the request is generated/received automatically responsive to the user 201 logging into the control panel 203. The request includes information about the user 201 such as a user name, whether the non-DJI feature is enabled (e.g., whether the user 201 is part of a workgroup instead of a domain), and the like. The control panel 203 forwards the request or a subset of the information from the request to the workload manager 204.

In some embodiments, the workload manager 204, the broker 205, or some other component of the platform 202, has programmed instructions to assign (e.g., select, reserve) one of the powered-up workload VMs 208 (e.g., VM 208A) to the user. If none of the workload VMs 208 is on, the workload manager 204, has programmed instructions to (e.g., makes an API call to the infrastructure provider API to) power up (e.g., turn on, boot up, enable, activate, make available, etc.) one of the workload VMs 208 (e.g., VM 208A). In some embodiments, the workload VM 208A notifies (e.g., indicates to, specifies to, alerts, informs) the platform 202 that the workload VM 208A is powered-up.

Once powered-up, the platform 202 (e.g., the workload manager 204) sends a set of tasks to the workload VM 208A (e.g., the guest agent 210) using, in some embodiments, command-and-control protocol (e.g., a hypertext transfer protocol secure (https) protocol over the port tcp/8112) over a second connection/communication channel. The workload VM 208A (e.g., the guest agent 210) sends a response using a response protocol (e.g., a https protocol over the port tcp/443) over a third connection/communication channel. In some embodiments, the communication of tasks is done asynchronously. In some embodiments, the workload manager 204 sends a first task, the guest agent 210 executes the task, the guest agent 210 responds to confirm the task was completed, the workload manager 204 sends a second task, and so on. In some embodiments, the set of tasks include logging off all users currently logged into the OS 209, attaching a disk, logging on a non-DJI user, and mounting a profile to the VM. In some embodiments, the set of tasks are given in a predetermined order.

The platform 202 (e.g., the control panel 203 or the workload manager 204) has programmed instructions to determine that the user 201 has a non-DJI feature enabled (e.g., that the user 201 is a non-DJI user, that the user 201 has requested a session on a non-DJI VM, etc.). In some embodiments, a user having a non-DJI feature can gain access to a VM even though the user is a non-DJI user (e.g., the user or an account of the user is not part of an enterprise/organization domain/directory managed by a directory service (e.g., Active Directory)). In some embodiments, a non-DJI VM is a standalone VM and not part of an organization's directory, at least with respect to the non-DJI user. A non-DJI VM lacks of group policy for management and domain trust for authentication/authorization. A non-DJI VM does not have access to network/corporate resources (e.g., servers, processors, memory, storage). All the resources of a non-DJI VM are local resources. The workload manager 204 has programmed instructions to determine that the user has the non-DJI feature enabled based on the information, or subset of information, in the user session request that is received from the control panel 203. For example, the information may include that the user is part of a workgroup, as opposed to a domain, or the information may include that the user name/identity is a local name/identity, e.g., does not include a domain or enterprise name (or an "@" or other special character, followed by the domain or enterprise name). In some embodiments, the platform 202 (e.g., the workload manager 204) has programmed instructions to notify the workload VM 208A (e.g., the guest agent 210) of a new user session. Notification of the new user session includes that user session is pending and that the user has the non-DJI feature enabled.

The workload manager 204 sends/forwards the session request, or a subset of information from the session request, to the guest agent 210. The guest agent 210 has programmed instructions to determine that the user has the non-DJI feature enabled. The guest agent 210 has programmed instructions to determine that the user has the non-DJI feature enabled based on the information, or subset of information, in the user session request that is received from the workload manager 204. For example, the information may include that the user is part of a workgroup, as opposed to a domain, or the information may include that the user name/identity is a local name/identity, e.g., does not include a domain or enterprise name (or an "@" or other special character, followed by the domain or enterprise name). In some embodiments, the user/session information is sent as part of the first task (e.g., to log off all users).

In some embodiments, the workload manager 204 has programmed instructions to send a request/command to the guest agent 210 to log off all users. In some embodiments, the guest agent 210 has programmed instructions to notify the platform 202 that the guest agent 210 has off all users currently logged into the OS 209 and/or that the platform 202 is to attach a profile disk.

The platform 202 (e.g., the workload manager 204) has programmed instructions to check if the user 201 has a profile disk (e.g., a disk assigned to the user). The platform 202 has programmed instructions to determine if the session is a first session or a repeat (e.g., second) session. If the platform 202 determines that the session is a first session (e.g., chronologically first session, first time, an earliest session, the disk is not yet created, etc.), the platform 202 makes a call to the infrastructure provider API in order to create a new disk for the user. If the platform 202 determines that the session is a repeat session (e.g., the disk is already created), the platform 202 proceeds to the next step. The platform 202 (e.g., the workload manager 204) makes a call to the infrastructure provider API to attach the disk to the workload VM 208A. In some embodiments, the workload manager 204 has programmed instructions to send a request/command to the guest agent 210 to check if the user 201 has a profile disk, the guest agent 210 responds, and based on the response, the workload manager 204 decides whether to create a new disk or to attach the pre-existing disk.

Once the disk is successfully attached, the workload manager 204 has programmed instructions to notify the guest agent 210 that disk is attached to (e.g., is included in, is present in, or is otherwise associated with) the VM 208A and to validate the disk (e.g., check whether the disk is formatted).

The guest agent 210 has programmed instructions to determine that the disk has been attached by, e.g., receiving the notification from the workload manager 204. The guest agent 210 has programmed instructions to check a file system on the attached. The guest agent 210 has programmed instructions to determine if the session is a first session or a repeat (e.g., second) session. Responsive to determining that the session is a first session, the guest agent 210 has programmed instructions to format the disk to an appropriate format, such as new technology file system (NTFS), create a volume identifier/label (e.g., "Profile-Disk") and set drive letter (e.g., to drive U:). Responsive to determining that the session is a repeat session, the guest agent 210 proceeds to the next step.

Once the disk is successfully validated and configured by the guest agent 210, in some embodiments, the workload manager 204 has programmed instructions to send a request/command to the guest agent 210 to initiate login a non-DJI user. Once the disk is successfully validated and configured by the guest agent 210, the guest agent 210 has programmed instructions to enable the disk service 212. In some embodiments, the disk service 212 is disabled by default in the master image 207.

In some embodiments, the guest agent 210 has programmed instructions to assign any non-DJI user a same user account (locally created in the OS 209) that is, in some embodiments, exclusively for the non-DJI feature. Responsive to determining that the session is a first session, the guest agent 210 has programmed instructions to (e.g., randomly) generate, or request generation of, a password (e.g., a random string). The generated password is linked to the OS 209 account. In some embodiments, a name identifying the OS 209 account is predetermined. In some embodiments, the name is configurable. Responsive to determining that the session is a repeat session, the guest agent 210 has programmed instructions to identify the password (e.g., fetch it from the appropriate memory or storage). After generating or identifying the password, the guest agent 210 has programmed instructions to set (e.g., reset) the password for the OS 209 account. The guest agent 210 has programmed instructions to pass credentials (e.g., name and the reset password) to the credential provider 211. The credential provider 211 has programmed instructions to initiate/perform a user login for the OS 209 account.

The disk service 212 has programmed instructions to detect a user login process and check if a profile associated with the OS 209 account is located on the profile disk. The disk service 212 has programmed instructions to determine if the session is a first session or a repeat (e.g., second) session. Responsive to determining that the session is a first session (e.g., a profile has not been created), the disk service 212 has programmed instructions to redirect, to the external profile disk, writes intended for the profile (e.g., decouple the profile from the OS 209 drive). Responsive to determining that the session is a repeat session or after redirecting writes, the disk service 212 has programmed instructions to mount (e.g., load, make accessible) the profile from the profile disk and to the OS 209 account.

The guest agent 210 has programmed instructions to detect that the disk service 212 has finished profile the mount process and notify the platform 202 (e.g., the workload manager 204) that a machine (e.g., the workload VM 208A, a machine/hardware associated with the workload VM 208A) is ready for the session (e.g., that login is complete). In some embodiments, the workload manager 204 instructs the control panel 203 that the VM 208A is ready. In some embodiments, the control panel 203 loads a terminal into a browser of the computing device of the user 201.

The terminal establishes fourth connection/communication channel (web socket connection) between the user 201 and the VM 208A using, for example, a remoting (e.g., streaming) protocol. The remoting protocol can be https or a proprietary protocol. Traffic is bidirectional on the fourth connection. For example, the OS 209 or a predetermined subset of applications running on the OS 209 are rendered on the terminal of user 201, and user inputs in the terminal are sent to the workload VM 208A. Whether the OS 209 or a predetermined subset of applications running on the OS 209 are rendered, or otherwise made accessible to the user 201, can be predetermined by an administrator.

Once the session is closed, the guest agent 210 has programmed instructions to logoff of the OS 209 account, and the changes to the profile are saved. Once the interactive session is closed, the guest agent 210 has programmed instructions to inform the platform 202 that a session is terminated (e.g., doesn't exist) and request for the disk to be detached from the workload VM 208A. Responsive to the request, the platform 202 has programmed instructions to detach the profile disk.

Figure 3:
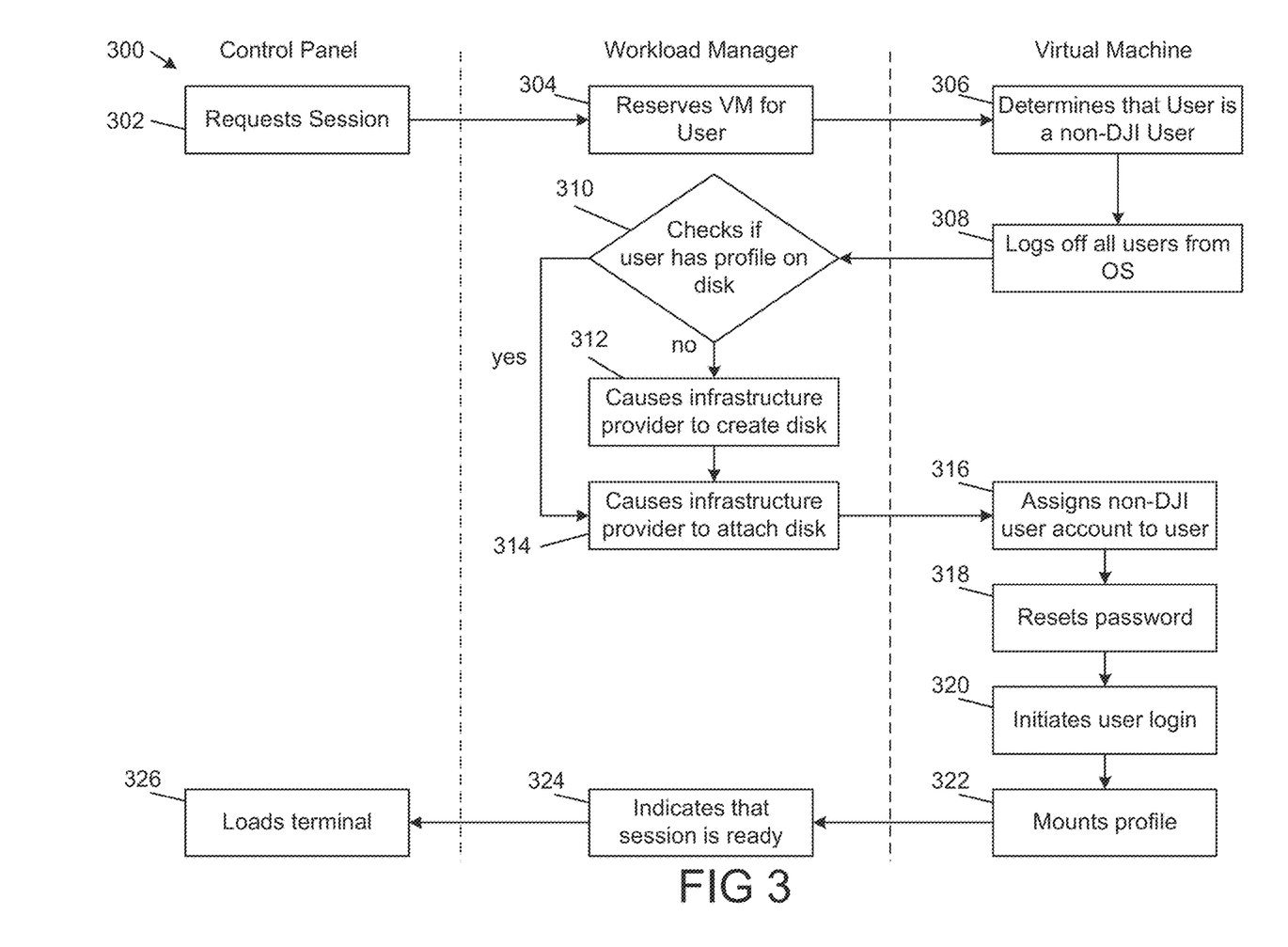
FIG. 3 is a flowchart of an example method for starting a session, in accordance with some embodiments of the present disclosure.

Referring now to FIG. 3, a flowchart of an example method 300 for starting a session is illustrated, in accordance with some embodiments of the present disclosure. The method 300 may be implemented using, or performed by, non-DJI system 200, one or more components of the non-DJI system 200 (e.g., the user 201, the platform 202, the workload manager 204, the broker 205, the workload VM 208A, the operating OS 209, the guest agent 210, the credential provider 211, and the disk service 212), or a processor associated with the non-DJI system 200 or the one or more components of the non-DJI system 200. Additional, fewer, or different operations may be performed in the method 300 depending on the embodiment.

At operation 302, the control panel 203 requests a session. In some embodiments, the control panel 203 requests, or receives a request for, the session responsive to a single input (e.g., click) from a user (e.g., a computing device of the user) 201. In some embodiments, the remaining operations execute automatically responsive to the session request. At operation 304, the workload manager 204, running on the platform 202, reserves the workload VM 208A for (e.g., assigns to) a user 201. At operation 306, the guest agent 210, running on the OS 209 of the workload VM 208A, determines that user 201 is associated with a non-DJI user. At operation 308, the guest agent 210 logs off all users from the OS 209 of the workload VM 208A. In some embodiments, the guest agent 210 notifies the workload manager 204 that the guest agent 210 is ready for the session (e.g., ready for attaching a disk, that all users from the OS 209 of the workload VM 208A). In some embodiments, the notification includes a request to attach a disk and/or to check if the user 201 has a profile. At operation 310, the workload manager 204 checks if the user 201 has a profile. If the workload manager 204 determines that the user 201 does not have the profile, at operation 312, the workload manager 204 causes (e.g., sends an API call to) an infrastructure provider API to create a profile (e.g., assign space on a disk to the user).

If the workload manager 204 determines that the user 201 has the profile, or the workload manager 204 completes operation 312, then, at operation 314, the workload manager 204 causes (e.g., sends an API call to) an infrastructure provider API to attach the disk. At operation 316, the guest agent 210 assigns a non-DJI account to the user. At operation 318, the guest agent 210 sets/resets a session password for the non-DJI account. In some embodiments, the guest agent 210 sends the session password to the credential provider 211 of the OS 209. At operation 320, the guest agent 210 causes the credential provider 211 to initiate the user login. In some embodiments, the guest agent 210 sends a notification to the disk service 212 of the OS 209 that the profile is ready to be mounted. At operation 322, the guest agent 210 causes the disk service 212 mounts a profile onto the VM 208A. In some embodiments, the disk service 212 intercepts writes intended for the OS 209 related to the profile, and redirects them to the disk. At operation 324, the workload manager 204 notifies the control panel 203 that the session is ready. At operation 326, the control panel 203 loads a terminal within a browser of the user 201. The terminal establishes communication with the workload VM 208A (e.g., the guest agent 210 and/or the OS 209). In some embodiments, further communications are supported with the connection. For example, the OS 209 and the applications of the workload VM 208A are rendered on the computing device of the user 201 and the VM 208A receives any inputs from the computing device of the user 201.

In some embodiments, the platform 202 is one or more instances of a user VM 120 with respect to the virtual computing system 100 of FIG. 1. In some embodiments, the workload VM 208A is an instance of a user VM 120 with respect to the virtual computing system 100 of FIG. 1. In some embodiments, the workload VM 208A is on a same or different cluster (e.g., datacenter, region, public cloud, private cloud, etc.) as/than a cluster on which the platform 202 resides, in some embodiments. In some embodiments, the profile disk is part of the storage pool 170 of FIG. 1. In some embodiments, instead of virtual machines (e.g., 208A), containers or other computing elements can be used. In some embodiments, the platform 202 is hosted on a cloud or datacenter by an enterprise or an infrastructure provider. In some embodiments, the cloud or datacenter may have multiple availability zones.

Each of the components (e.g., elements, entities) of the virtual computing system 100 and the non-DJI system 200 (e.g., the user 201, the platform 202, the workload manager 204, the broker 205, the workload VM 208A, the operating OS 209, the guest agent 210, the credential provider 211, and the disk service 212), is implemented using hardware, software, or a combination of hardware or software, in one or more embodiments. The components of the virtual computing system 100 and the non-DJI system 200 can include any application, program, library, script, task, service, process or any type and form of executable instructions executed by one or more processors (e.g., the processing unit 192A), in one or more embodiments. Each of the one or more processors is hardware. The instructions may be stored on one or more computer readable and/or executable storage media including non-transitory storage media such as non-transitory storage media in the storage pool 170 with respect to FIG. 1.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor with programmed instructions to:
   receive a first request for a computing device associated with a user to remotely access a first session on an operating system of a non-domain joined instance (non-DJI) virtual machine (VM);
   automatically and responsive to the first request:
      check whether any profile disk is assigned to the user;
      in response to determining that no profile disk is assigned to the user, cause a server to create a profile disk for the user for storing a profile of the user;
      cause the server to attach, to the VM, the profile disk;
      assign an account of the operating system to the user;
      reset a password for the account;
      login the user to the first session on the VM using the account and the password;
      mount, on the VM, the profile;
      cause a first connection to be established between the computing device and the VM;
   receive a second request for the computing device to remotely access a second session on the operating system of the non-DJI VM;
   automatically and responsive to the second request:
      check whether any profile disk is assigned to the user;
      in response to determining that the profile disk is assigned to the user, cause a server to attach, to the VM, the profile disk;
      assign the account of the operating system to the user;
      reset the password for the account;
      login the user to the second session on the VM using the account and the password;
      mount, on the VM, the profile; and
      cause a second connection to be established between the computing device and the VM.

2. The apparatus of claim 1, wherein the account assigned to the user is dedicated for sessions on non-DJI VMs.

3. The apparatus of claim 1, the processor having further programmed instructions to log off another user from the non-domain joined instance (non-DJI) virtual machine (VM), responsive to receiving the request.

4. The apparatus of claim 1, the processor having further programmed instructions to:
   cause a terminal to load within a browser of the computing device; and
   cause the terminal to establish the connection with the VM.

5. The apparatus of claim 1, the processor having further programmed instructions to redirect, to the disk, writes addressed to the operating system and corresponding to the profile.

6. The apparatus of claim 1, the processor having further programmed instructions to:
   log off the user from the first session; and
   detach the profile disk.

7. The apparatus of claim 1, wherein the non-DJI VM is not joined to any domain.

8. A non-transitory computer readable storage medium having instructions stored thereon that, upon execution by a processor, causes the processor to perform operations comprising:
   receiving a first request for a computing device associated with a user to remotely access a first session on an operating system of a non-domain joined instance (non-DJI) virtual machine (VM);
   automatically and responsive to the first request:
      checking whether any profile disk is assigned to the user;
      in response to determining that no profile disk is assigned to the user, causing a server to create a profile disk for the user for storing a profile of the user;
      causing the server to attach, to the VM, the profile disk;
      assigning an account of the operating system to the user;
      resetting a password for the account;
      logging in the user to the first session on the VM using the account and the password;
      mounting, on the VM, the profile;
      causing a first connection to be established between the computing device and the VM;
   receiving a second request for the computing device to remotely access a second session on the operating system of the non-DJI VM;
   automatically and responsive to the second request:
      checking whether any profile disk is assigned to the user;
      in response to determining that the profile disk is assigned to the user, causing a server to attach, to the VM, the profile disk;
      assigning the account of the operating system to the user;
      resetting the password for the account;
      logging in the user to the second session on the VM using the account and the password;
      mounting, on the VM, the profile; and
      causing a second connection to be established between the computing device and the VM.

9. The medium of claim 8, wherein the account assigned to the user is dedicated for sessions on non-DJI VMs.

10. The medium of claim 8, the operations further comprising logging off another user from the non-domain joined instance (non-DJI) virtual machine (VM), responsive to receiving the request.

11. The medium of claim 8, the operations further comprising:
   causing a terminal to load within a browser of the computing device; and
   causing the terminal to establish the connection with the VM.

12. The medium of claim 8, the operations further comprising redirecting, to the disk, writes addressed to the operating system and corresponding to the profile.

13. The medium of claim 8, the operations further comprising:
   logging off the user from the first session; and
   detaching the profile disk.

14. The non-transitory computer readable storage medium of claim 8, wherein the non-DJI VM is not joined to any domain.

15. A computer-implemented method comprising:
   receiving, by a processor, a first request for a computing device associated with a user to remotely access a first session on an operating system of a non-domain joined instance (non-DJI) virtual machine (VM);
   automatically and responsive to the first request:
      checking whether any profile disk is assigned to the user;

in response to determining that no profile disk is assigned to the user, causing a server to create a profile disk for the user for storing a profile of the user;

causing, by the processor, the server to attach, to the VM, the profile disk;

assigning, by the processor, an account of the operating system to the user;

resetting, by the processor, a password for the account;

logging in, by the processor, the user to the first session on the VM using the account and the password;

mounting, by the processor and on the VM, the profile;

causing, by the processor, a first connection to be established between the computing device and the VM;

receiving a second request for the computing device to remotely access a second session on the operating system of the non-DJI VM;

automatically and responsive to the second request:
  checking whether any profile disk is assigned to the user;
  in response to determining that the profile disk is assigned to the user, causing a server to attach, to the VM, the profile disk;
  assigning the account of the operating system to the user;
  resetting the password for the account;
  logging in the user to the second session on the VM using the account and the password;
  mounting, on the VM, the profile; and
  causing a second connection to be established between the computing device and the VM.

16. The method of claim 15, wherein the account assigned to the user is dedicated for sessions on non-DJI VMs.

17. The method of claim 15, further comprising logging off another user from the non-domain joined instance (non-DJI) virtual machine (VM), responsive to receiving the request.

18. The method of claim 15, further comprising:
causing a terminal to load within a browser of the computing device; and
causing the terminal to establish the connection with the VM.

19. The method of claim 15, further comprising redirecting, to the disk, writes addressed to the operating system and corresponding to the profile.

20. The method of claim 15, wherein the non-DJI VM is not joined to any domain.

* * * * *